US011954612B2

(12) United States Patent
Giovannini et al.

(10) Patent No.: US 11,954,612 B2
(45) Date of Patent: Apr. 9, 2024

(54) COGNITIVE MODERATOR FOR COGNITIVE INSTANCES

(71) Applicant: INTERNATIONAL BUSINESS MACHINES CORPORATION, Armonk, NY (US)

(72) Inventors: Andrea Giovannini, Zurich (CH); Florian Graf, Zurich (CH); Stefan Ravizza, Wallisellen (CH); Tim U. Scheideler, Schoenenberg (CH)

(73) Assignee: International Business Machines Corporation, Armonk, NY (US)

( * ) Notice: Subject to any disclaimer, the term of this patent is extended or adjusted under 35 U.S.C. 154(b) by 1143 days.

(21) Appl. No.: 15/695,989

(22) Filed: Sep. 5, 2017

(65) Prior Publication Data

US 2019/0073598 A1 Mar. 7, 2019

(51) Int. Cl.
*G06N 5/043* (2023.01)
*G06F 16/2458* (2019.01)
(Continued)

(52) U.S. Cl.
CPC ......... *G06N 5/043* (2013.01); *G06F 16/2471* (2019.01); *G06N 5/01* (2023.01);
(Continued)

(58) Field of Classification Search
CPC ........ G06N 5/043; G06N 5/003; G06N 5/022; G06N 5/041
See application file for complete search history.

(56) References Cited

U.S. PATENT DOCUMENTS 5,278,980 A * 1/1994 Pedersen ............. G06F 16/3325
7,082,190 B2 7/2006 Simpson
(Continued)

FOREIGN PATENT DOCUMENTS

CN 102364893 A 2/2012
CN 105808685 A 7/2016
(Continued)

OTHER PUBLICATIONS

Hawking et al., "Measuring Search Engine Quality," Kluwer Academic Publishers (2001) (Year: 2001).*
(Continued)

*Primary Examiner* — Kakali Chaki
*Assistant Examiner* — Kevin L. Smith
(74) *Attorney, Agent, or Firm* — Tihon Poltavets

(57) ABSTRACT

A method includes receiving a first query by a computing device and assigning the first query to a plurality of cognitive engines, wherein each of the plurality of cognitive engines include different characteristics for processing data. The method also includes, responsive to receiving a response from each of the plurality of cognitive engines for the first query, comparing the received responses from the plurality of cognitive engines. The method also included responsive to determining a difference between a first response from a first cognitive engine and a second response from a second cognitive engine is above a predetermined threshold value, performing a response mediation process until the difference is below the predetermined threshold value. The method also includes selecting a first final response from the received responses for the first query and the second query and displaying the first final response to a user.

23 Claims, 8 Drawing Sheets

(51) Int. Cl.
*G06N 5/01* (2023.01)
*G06N 5/022* (2023.01)
*G06N 5/04* (2023.01)
*G06N 20/00* (2019.01)

(52) U.S. Cl.
CPC .............. *G06N 5/022* (2013.01); *G06N 5/041* (2013.01); *G06N 20/00* (2019.01)

(56) References Cited

U.S. PATENT DOCUMENTS

| | | | |
|---|---|---|---|
| 8,346,563 | B1 | 1/2013 | Hjelm et al. |
| 8,392,394 | B1* | 3/2013 | Kumar ................. G06F 16/951 707/706 |
| 9,348,900 | B2 | 5/2016 | Alkov et al. |
| 2003/0028512 | A1* | 2/2003 | Stensmo ............ G06F 16/3325 |
| 2003/0167454 | A1* | 9/2003 | Iordanov ............... G09B 23/28 717/104 |
| 2006/0122973 | A1* | 6/2006 | Berg ................. G06F 16/24528 |
| 2009/2926961 | | 11/2009 | Shuster |
| 2010/0191686 | A1* | 7/2010 | Wang ..................... G06F 16/33 707/E17.014 |
| 2014/0272909 | A1* | 9/2014 | Isensee ................... G09B 7/02 434/362 |
| 2016/0140439 | A1 | 5/2016 | Adderly et al. |
| 2017/0206270 | A1 | 7/2017 | Bufe, III |
| 2018/0114111 | A1* | 4/2018 | Gill ........................ G06N 5/022 |
| 2019/0073598 | A1 | 3/2019 | Giovannini |

FOREIGN PATENT DOCUMENTS

| | | |
|---|---|---|
| CN | 106649554 A | 5/2017 |
| CN | 111033490 A | 4/2020 |
| GB | 2579006 A | 6/2020 |
| JP | 11161659 A | 6/1999 |
| JP | 2003345821 A | 12/2003 |
| JP | 2011076144 A | 4/2011 |
| JP | 2011107880 A | 6/2011 |
| JP | 2020532804 A | 11/2020 |
| WO | 2019048957 A1 | 3/2019 |

OTHER PUBLICATIONS

Cui et al., "Question Answering Passage Retrieval using Dependency Relations," SIGIR '05 (ACM 2005) (Year: 2005).*
Khan et al., "Machine Learning Algorithms for Natural Language Semantics and Cognitive Computing," IEEE (2016) (Year: 2016).*
Kollia et al., "Using the IBM Watson Cognitive System in Educational Contexts," IEEE (2016) (Year: 2016).*
Chen et al., "IBM Watson: How Cognitive Computing Can Be Applied to Big Data Challenges in Life Sciences Research," Clinical Therapeutics (2016) (Year: 2016).*
Michael Schubert, "Social Metacognition in Dyadic Learning," Thesis (2016) (Year: 2016).*
Zodorozhny et al., "Efficient Evaluation of Queries in a Mediator for WebSources," ACM (2002) (Year: 2002).*
International Search Report and The Written Opinion, dated Jan. 21, 2019, International Application No. PCT/IB2018/056305, International Filing Date: Aug. 21, 2018.
Fan, et al. "Automatic knowledge extraction from documents", IBM J. Res. & Dev. Vol. 56 No. 3/4 Paper 5 May/Jul. 2012, pp. 1-10.
Scerri et al., "Cognitive Instance-Based Learning Agents in a Multi-Agent Congestion Game", Proceedings of the Workshop on Multiagent Interaction Networks (MAIN 2013), held in conjunction with AAMAS 2013, May 7, 2013, St. Paul, MN, pp. 1-8.
Office Action received on Japanese Patent Application No. 2020-512817, filed Aug. 21, 2018, pp. 1-3.
Chinese Patent Office, "Notification of the First Office Action," Chinese Application No. 201880057072.6, dated Feb. 11, 2023, 12 pages.

* cited by examiner

COGNITIVE MODERATOR FOR COGNITIVE INSTANCES

FIELD OF THE INVENTION

This disclosure relates generally to cognitive computing, and more specifically, to a method for generating an improved response to a query addressed to two different cognitive engines. The invention further relates to a system for generating an improved response to a query from two different cognitive engines, and a computer program product.

BACKGROUND OF THE INVENTION

Presently, cognitive computing is partially a commodity service, where mobile or cloud computing providers produce and deliver end-user oriented devices that can recognize and interpret spoken language. The end-user oriented devices can also act as personal assistants and knowledge navigators. Cognitive services from different providers use different data sources, different algorithms, and different tuning parameters and can apply different self-learning methods over time. In addition, attributes of the different providers may be specific to a specific group of users of the cognitive service, e.g., speaking a specific type of language. A cognitive service from a first cognitive service provider trained with a first language, may give different answers than a cognitive service from a second cognitive service provider trained with a second language. The end-user is typically interested in obtaining the most valuable response to a question.

There are several disclosures related to a method for generating answers from a cognitive system. The document "Cognitive Instance-Based Learning Agents in a Multi-Agent Congestion Game", Paul Scerri et al, Workshop on Information Sharing in Large Multi-Agent Systems at AAMAS, 2013 discloses an empirical comparison of a multi-agent learning approach inspired by human ways of learning against a more numerical intensive agent way of learning. More specifically, the agents must repeatedly traverse a graph and the agents on the same edge which interfere with one another, so learning is required to find uncongested routes. However, learning by multiple agents can lead to undesirable and unwanted dynamics because the learning creates a non-stationary environment for the other agents to learn against.

SUMMARY

Embodiments in accordance with the present invention disclose a method, computer program product and computer system for cognitive moderation, the method comprising, receiving, at a computing device, a first query; assigning, by the computing device, the first query to a plurality of cognitive engines, wherein each of the plurality of cognitive engines include different characteristics for processing data; responsive to receiving a response from each of the plurality of cognitive engines for the first query, comparing, by the computing device, the received responses from the plurality of cognitive engines; responsive to determining a difference between a first response from a first cognitive engine and a second response from a second cognitive engine is above a predetermined threshold value, performing, by the computing device, a response mediation process until the difference is below the predetermined threshold value, wherein the response mediation process comprises: sending, by the computing device, the first response to the second cognitive engine; determining, by the computing device, a common concept between the first response and the second response; generating, by the computing device, a second query based on the first response and a knowledge database; sending, by the computing device, the second query to the second cognitive engine; and receiving, at the computing device, a third response from the second cognitive engine for the second query; selecting, by the computing device, a first final response from the received responses for the first query and the second query; and displaying by the computing device, the first final response to a user.

The computer system comprising, one or more computer processors; one or more computer readable storage media; and program instructions stored on the computer readable storage media for execution by at least one of the one or more computer processors, the program instructions comprising: program instructions to receive a first query; program instructions to assign the first query to a plurality of cognitive engines, wherein each of the plurality of cognitive engines include different characteristics for processing data; program instructions to, responsive to receiving a response from each of the plurality of cognitive engines for the first query, compare the received responses from the plurality of cognitive engines; program instructions to, responsive to determining a difference between a first response from a first cognitive engine and a second response from a second cognitive engine is above a predetermined threshold value, perform a response mediation process until the difference is below the predetermined threshold value, wherein the response mediation process comprises: program instructions to send the first response to the second cognitive engine; program instructions to determine a common concept between the first response and the second response; program instructions to generate a second query based on the first response and a knowledge database; program instructions to send the second query to the second cognitive engine; and program instructions to receive a third response from the second cognitive engine for the second query; program instructions to select a first final response from the received responses for the first query and the second query; and program instructions to display the first final response to a user.

The computer program product one or more computer readable storage media and program instructions stored on at least one of the one or more storage media, the program instructions comprising: program instructions to receive a first query; program instructions to assign the first query to a plurality of cognitive engines, wherein each of the plurality of cognitive engines include different characteristics for processing data; program instructions to, responsive to receiving a response from each of the plurality of cognitive engines for the first query, compare the received responses from the plurality of cognitive engines; program instructions to, responsive to determining a difference between a first response from a first cognitive engine and a second response from a second cognitive engine is above a predetermined threshold value, perform a response mediation process until the difference is below the predetermined threshold value, wherein the response mediation process comprises: program instructions to send the first response to the second cognitive engine; program instructions to determine a common concept between the first response and the second response; program instructions to generate a second query based on the first response and a knowledge database; program instructions to send the second query to the second cognitive engine; and program instructions to receive a third response from the second cognitive engine for the second query; program instructions to select a first final response from the received responses for the first query and the second query; and program instructions to display the first final response to a user.

DETAILED DESCRIPTION

Figure 1:
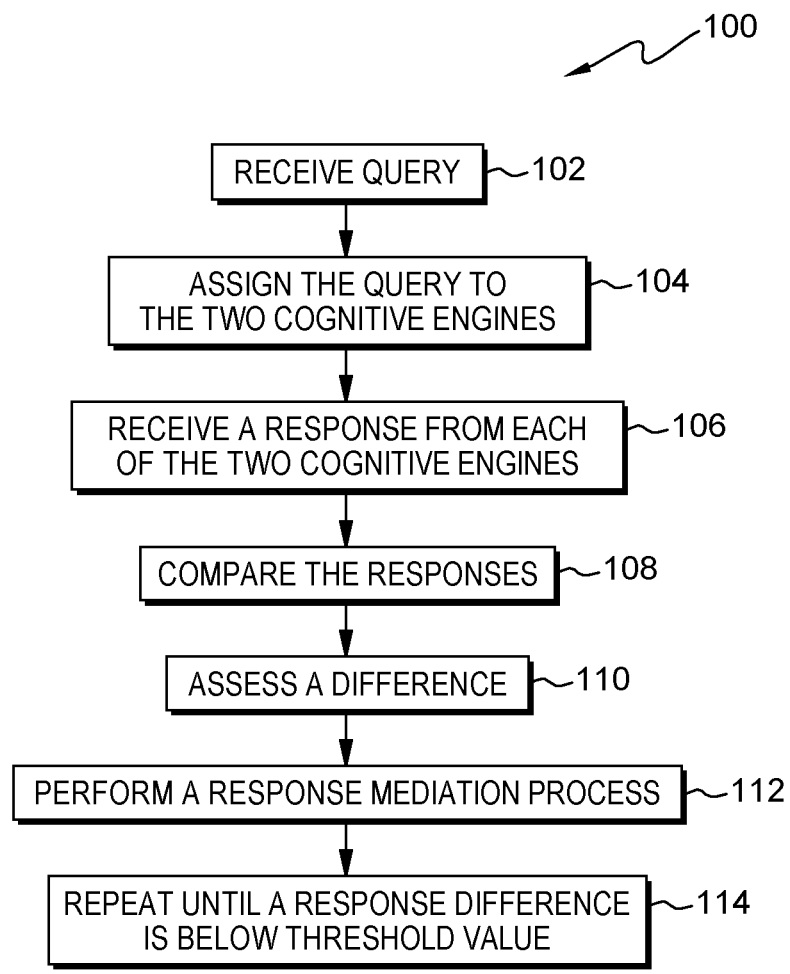
FIG. 1 is a functional block diagram illustrating a distributed data processing environment, in accordance with an embodiment of the present invention.

The proposed method for generating an improved response to a query from two different cognitive engines may offer multiple advantages and technical effects:

By taking into account responses from two or more cognitive engines, a moderating unit enabled to access and weighing different responses from different cognitive engines may be designed and configured to generate improved responses to an end-user's query, compared to single responses from an individual cognitive engine. The responses may have improved accuracy by using a plurality of cognitive engines. In addition, the proposed method and the related system may integrate responses from multiple cognitive instances into a more useful response for the end user. It may also be possible to display a decision tree for a specific response, where the decision tree showing pros and cons from different sources.

Furthermore, leveraging specialized cognitive instances/cognitive engines for queries, or parts thereof, is possible according to a special knowledge field. Thus, avoiding the end user having to decide which cognitive engine may address a query, but rather the combined knowledge of a plurality of cognitive engines determines which cognitive engine may have the most appropriate answer (i.e., improved response) for a specific user query.

By weighing responses and other method and system variations from different cognitive engines being specialized in different knowledge fields, it may become possible to check responses in terms of relevancy, self-consistency, and whether a specific response is addressing a complete query or only parts of it. These checks may be used for a self-learning process of the cognitive moderator engine.

The proposed method and the system allows one of two cognitive engines, which may be slightly different (e.g., different corpora and tuning) or completely different (e.g., different algorithms), to be used as a cognitive moderator engine that is a specialized computing device, with small overhead in one of the two cognitive services related to the two cognitive engines. The smaller overhead results in a lower Central Processing Unit (CPU) usage rate and a lower Random Access Memory (RAM) usage rate, in a consolidated system with fewer devices required to provide the cognitive services.

In the following, some more embodiments of the proposed method and system will be described:

In one embodiment, the method may comprise adapting a corpus of data of at least one of the cognitive engines to give a response with the scope of the final response. This may be achieved by amending one or more knowledge graphs. Alternatively, instead of a knowledge graph, one or more linked lists may be used. Consequently, the adapting the corpus of data may basically be equivalent to adding the missing concept into the knowledge graph such that in the future this cognitive engine generates a response that may be in line with the finally selected response. The query and the response may be in natural language form, where the natural language may be any human spoken natural language. Thus, a user may formulate his query or question in a natural way to the system of cognitive engines. Alternatively, the queries may also comprise data from a sensor (e.g., an image sensor), stand-alone or in combination with an acoustic sensor or the like, in order to allow queries such as "is this a picture of a sports car?" or similar.

In another embodiment, the method may also comprise assigning the query to more than two cognitive engines, where the two cognitive engines each have different characteristics. At least one characteristic may be selected out of the group comprising different data sources (i.e., different corpora), different tuning parameters of the cognitive engine, and/or different algorithms. Thus, it may be useful for the general and proposed concept to apply the cognitive engines having different behaviors and thus, generating different responses. These responses may vary slightly or to a higher degree depending on the specific knowledge area.

The method may also comprise classifying (i.e., assigning a score value) the two cognitive engines by a set of test queries and related responses. The set of test queries may be predefined for the purpose of the classification of the cognitive engines, to deduce the capacity of specific cognitive engines. As a result, the method may also assign a score value to each of the cognitive engines. The score value may allow a categorization into different knowledge fields, such as, physics, philosophy, chemistry, and politics. The classification may be performed during a startup/training procedure for the cognitive engines. Additionally, more than two cognitive engines may be allowed as part of the method and the training phase. The classification process may then assign different knowledge areas to the different cognitive engines.

The method may further comprise assessing a type of query and weighing a response of a cognitive engine having a score value matching the type of question/query higher than responses from a cognitive engine not matching the type of query. Translating into human categories allows for trust in a cognitive engine being a "specialist" in the technical field of the query. The concept may be extended to a relative distance between the type of query and the score value. The assigning and weighing process may be performed by the cognitive moderator engine.

The cognitive moderator engine can divide the query into parts according to at least two categories selected out of the group comprising geographic topics, sensor type related topics, type related topics, and assigning each of the parts to a different cognitive engine. As a result, increasing a higher relevancy of a generated response of one of the cognitive engines. The assigning of each part is performed according to a category selected out of the group comprising geographic topics, sensor type related topics and thematic related topics. Thus, the method may be applied according to the categorization of the cognitive engines, as well as dividing the query into parts.

In one possible embodiment, one of the cognitive engines and the cognitive moderator engine may be identical, resulting in one of the two cognitive engines taking over the role of two fundamental elements of the method and the related system: the cognitive engine itself as well as the cognitive moderator engine. This may save valuable resources and may generate comparable responses when compared to a three part solution comprising the cognitive moderator engine and at least two cognitive engines.

One of the cognitive engines may comprise a level-2 moderator system connected to two level-2 cognitive engines. Thus, a hierarchy of cognitive engines and cognitive moderator engines may be built allowing for a much deeper and more sophisticated response generation. The depth (i.e., number of hierarchy levels), as well as the breadth (i.e., the number of parallel cognitive engines couples to a cognitive moderator engine per level), of the proposed concept and the related system is theoretically unlimited allowing for a fine-tuned response generator applicable to almost any type of query or question.

The method may also comprise eliminating an inappropriate (i.e., poor or inadequate) response of a cognitive engine by assessing the response in terms of self-consistency, by provoking the same or similar answer to slightly modified questions, relevancy, and coverage, by reformulating the query in different ways and comparing related partial responses.

The self-consistency may be given if responses to slightly modified queries may result in the same response. Also, a predefined threshold may be applicable. If a comparison value of the responses stays below a predefined threshold value, the responses are determined as having self-consistency.

According to one additional embodiment, the method may also comprise eliminating the response from the cognitive engine not matching the type of the query. Thus, if responses from different cognitive engines are significantly different, these responses may be selected from the type of the current cognitive engine that are determined by a set of standard queries (compare the training session mentioned-above) matching the type of the query. As a result, a greater probability for a useful response is produced. If a plurality of cognitive engines are being applied, the responses building the majority are preferred over responses from a minority group.

According to a further embodiment of the method, a coverage may be given if the response may address all parts of a primary query. Thus, there remains no missing partial response to a query split up in parts.

The method may also comprise selecting a cognitive engine for assigning the query depending on an availability signal indicative of an availability of the cognitive engine. This may be an advantageous feature for cognitive engines deployed in a cloud computing environment as a service. If a cognitive engine is "booked out" (i.e., full usage), the query may not be assigned to this cognitive engine. Instead, another cognitive engine out of a plurality of cognitive engines may be chosen. The selection criteria may be influenced by the type of question and type of cognitive engine(s). It may also be possible, instead of assigning the query to one alternative cognitive engine, to assign the query to a plurality of other alternative cognitive engines.

According to one advantageous embodiment of the method, the determining of a common concept may comprise applying a fuzzy match method and/or a synonym match based on an ontology. A dictionary with synonyms of a specific expression may be used, so that the query may be multiplied to a plurality of queries comprising an original expression in the form of one or a plurality of synonyms.

The method also has the ability to generate a second question that may comprise, addressing with the second question a missing link between nodes, which may comprise knowledge concepts, in a knowledge graph. In the knowledge graph, a first link may exist between a first concept, representing one of the responses, and a third concept. In the knowledge graph, a second link may exist between a second concept, representing the other of the responses, and the third concept. However, no link may exist between the first concept and the second concept such that a potential link between the first concept and the second concept may represent the "missing link". As mentioned above, instead of the knowledge graph the proposed method may also work with a linked list of tables.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

In the context of this description, the following conventions, terms and/or expressions may be used:

The term 'improved response' may denote a response from a federation of cognitive engines if compared to a response (or answer—both expressions may be used as synonyms in the context of this document) of a single cognitive engine. This concept allows for using the combined knowledge of two or more cognitive engines. One may also view this as using the swarm intelligence of a plurality of cognitive engines because they are combined to influence and enhance responses mutually.

The term 'cognitive engine' may denote a technology platform based on the scientific disciplines of artificial intelligence and signal processing. Basically, these platforms may encompass machine learning, reasoning, natural language processing, speech and vision, human-computer interaction, dialog and narrative generation and more.

The term cognitive engine may be described as having components used to develop, and behaviors resulting from, systems that learn at scale, reason with purpose and interact with humans naturally. Accordingly, while sharing many attributes with the field of artificial intelligence, it differentiates itself via the complex interplay of disparate components, each of which comprises their own individual mature disciplines.

Some features that cognitive engines or systems may express comprise: Adaptive: They may learn as information changes, and as goals and requirements evolve. They may resolve ambiguity and tolerate unpredictability. They may be engineered to be fed with dynamic data in real time, or near real time. Interactive: They may interact easily with users, so that those users can define their needs comfortably. They may also interact with other processors, devices, and cloud computing services, as well as with people. Iterative and stateful: They may aid in defining a problem by asking questions or finding additional source input if a problem statement is ambiguous or incomplete. They may "remember"—i.e., store—previous interactions in a process and return information that is suitable for the specific application at that point in time. Contextual: They may understand, identify, and extract contextual elements such as meaning, syntax, time, location, appropriate domain, regulations, user's profile, process, task and goal. They may draw on multiple sources of information, including both, structured and unstructured digital information, as well as sensory inputs (visual, gestural, auditory, or sensor-provided). The term 'query' may denote, in the context of this document, a question asked—or queried—to a cognitive system. It may be equivalent to an input received by the system via a user interface. The terms query and question may be used interchangeably within this document. The query may come in a variety of different formats: as text, as voice input, as image or a form of sensor data of any kind (e.g., temperature field data, weather data, flow data, . . . ).

The term 'query' may denote, in the context of this document, a question asked—or queried—to a cognitive system. It may be equivalent to an input received by the system via a user interface. The terms query and question may be used interchangeably within this document. The query may come in a variety of different formats: as text, as voice input, as image or a form of sensor data of any kind (e.g., temperature field data, weather data, flow data, . . . ).

The term 'response' may denote an output of a cognitive system. It may also be denoted as answer to a question/query. The term 'improved response' may denote a response representing a better, more precise or suitable answer to a question generated by a federation of cognitive engines if compared to a response of a single cognitive engine. The adjective 'improved' not always applies to a single query and a single answer. However, on average of a plurality of queries, the responses of the proposed system can be denoted as improved in terms of accuracy, reliability, preciseness and trust-ability.

The term 'difference'—in particular, a difference between responses of different cognitive engines—may basically denote a numerical value being derived from different responses. The responses itself may be structured in form of a string, i.e., a couple of words, a sentence or a fragment of a sentence. The string may be represented by a vector with one word per dimension. Then a string compare may be performed per dimension. A difference may be based on such a string compare (e.g., completely identical or a difference in a number of letters)—algorithms for such string compare resulting in a numerical value are known by a skilled person. Alternative comparison methods for determining a difference may also be based on a fuzzy string matching the algorithm, resulting in, e.g., 80% match (or any other value). The result of such a comparison my always be expressed as a numerical value which may then—after a normalization—be compared to a threshold value.

The term 'knowledge database' may denote a consolidated database storing concepts and facts which may be linked to each other. This may be implemented in form of a knowledge graph (or an interlinked plurality of them), or a set of linked lists.

The term 'corpus' may denote the knowledge in form of concepts and facts of a knowledge database. 'Adapting a corpus' may then denote changing the content of the knowledge database by adding new concepts and/or facts and adding or changing links between the nodes of the knowledge database.

The term 'natural language' may denote here and in neuropsychology, linguistics and the philosophy of language, a natural language or ordinary language that has evolved naturally in humans through use and repetition without conscious planning or premeditation. Natural languages can take different forms, such as speech, signing, or writing. They are distinguished from constructed and formal languages such as those used to program computers or to study logic.

The term 'level-2 moderator system' may denote a cognitive moderator engine not being placed in the top level or the root of a tree of cognitive engines and cognitive moderator engines, but in a lower, i.e., $2^{nd}$ level. Also level-3 cognitive moderator engines—and so forth—may be possible.

The term 'level-2 cognitive engines' may denote a cognitive engine being positioned in an upmost leaf position in a tree of cognitive engines and cognitive moderator engines. A more comprehensive definition is given in the context of FIG. 5.

In the following, a detailed description of the figures will be given. All instructions in the figures are schematic. Firstly, a block diagram of an embodiment of the inventive method for generating an improved response to a query from two different cognitive engines is given. Afterwards, further embodiments, as well as embodiments of the system for generating an improved response to a query from two different cognitive engines, will be described.

FIG. 1 shows a block diagram of an embodiment of method 100 for generating an improved response to a query or question from two different cognitive engines. The query or question may be received, 102, from a user, e.g., by a user interface (UI). The user interface may be a classical text-based UI, voice input image or video input, a combination thereof or it may be represented by other kind of sensors and related data.

Method 100 also comprises (a) assigning, 104, the query to the two cognitive engines having different characteristics—which are different in terms of characteristics—(b) receiving, 106, a response from each of the two cognitive engines, (c) comparing, 108, the responses and, (d) upon assessing, 110, a difference above a predetermined threshold value between the responses, performing, 112, a response mediation process. Such a response mediation process comprises feeding a response of the first of the cognitive engines to the second one of the cognitive engines, which may also be described as "peer review", determining a common concept of at least two of the responses or, generating from a response and a knowledge database a second question and, assigning it to the other one of the cognitive engines. For determining the common concept, a fuzzy match method and/or an ontology based and/or synonym based method may be utilized. The second question/query based on knowledge graph or linked lists/tables, as explained above, when discussing the "missing link".

Method 100 further comprises (e) repeating, 114 steps (b) to (d) until the difference is below or equal to the predetermined threshold value. This may represent a consolidation or convergence and converging towards an answer and/or response. Finally, the method comprises (f) selecting, 116, one of the responses as a final response and displaying the final response to a user. If the two responses of the two cognitive engines are assessed to be equivalent or equal, one of the two responses may, e.g., be selected randomly, by the concept of a leading cognitive machine or by a fixed sequence of selected responses for different queries. Also, any other selection process may be applied if the two responses are equivalent to each other. Furthermore, steps (a) to (f) are performed by a cognitive moderator, such that an improved response is generated.

Figure 2:
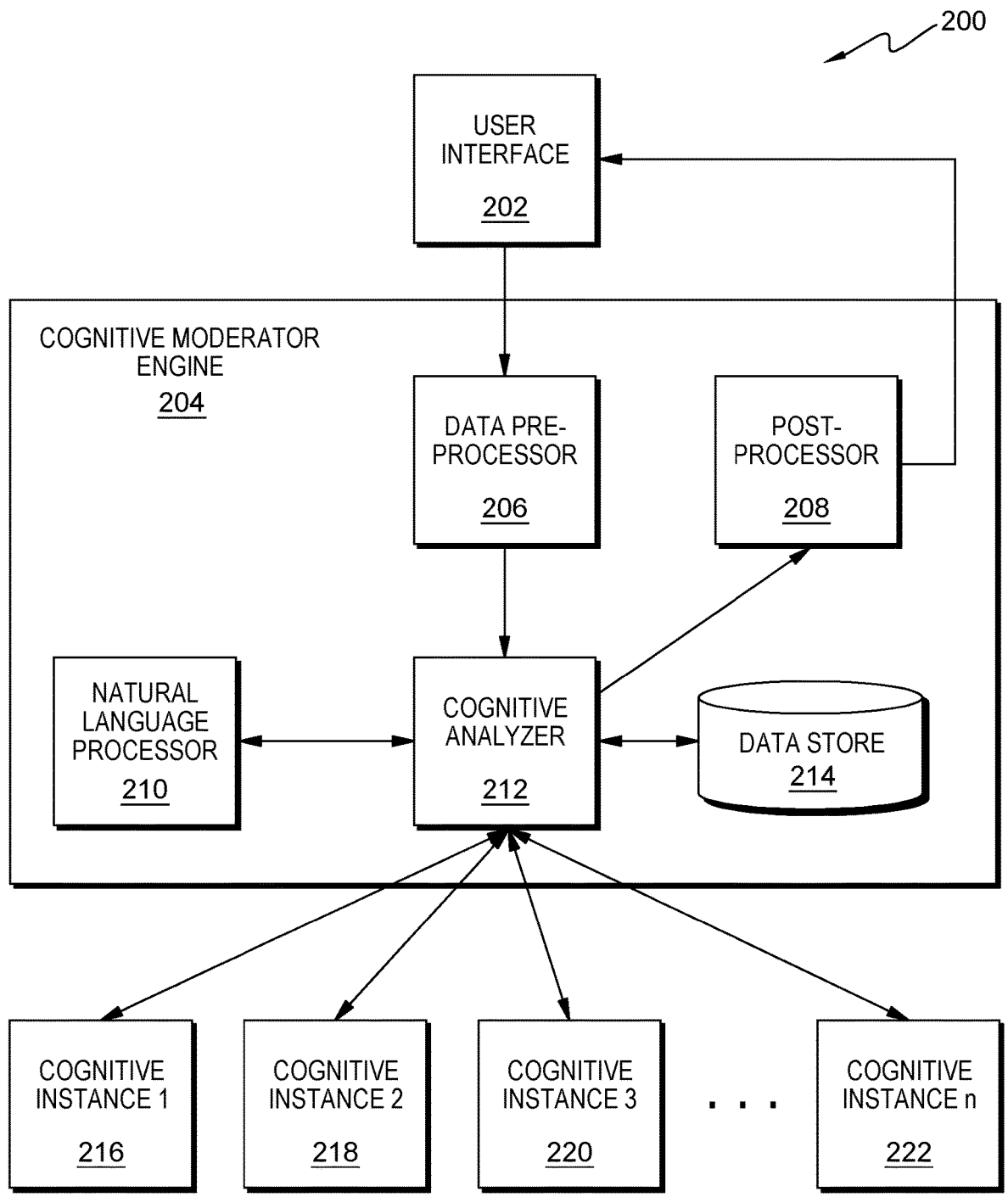
FIG. 2 is a flowchart depicting operational steps of a partial redundancy elimination module for eliminating redundancy with fixed number of temporaries, in accordance with an embodiment of the present invention.

FIG. 2 shows a block diagram of an embodiment 200 of involved components for performing the proposed method 100. User interface 202 is adapted to post a question/query in various forms to cognitive moderator engine 204, e.g., as written input, speech and/or as a data stream. User interface 202 is implemented depending on the range of input formats supported.

Cognitive moderator engine 204 is a specialized computing device that comprises the following elements: a data pre-processor 206 for detecting the data format of the questions posted and for performing a basic check, e.g., whether the question is in a supported format. Cognitive analyzer 212 parses the query, and handles the communication with cognitive engines 216, ..., 222 and finally sends the answer to postprocessor 208. Natural language processor 210 supports the cognitive process to interpret queries and answers, and formulate follow-up questions and/or queries and the final answer.

Cognitive analyzer 212 uses data store 214 to store test questions (used to evaluate new cognitive engines) and experiences collected over time from working with the various cognitive engines 216, ..., 222 and uses this information when working with cognitive engines 216, ..., 222. Data store 214 ensures that cognitive analyzer 212 can learn new concepts and facts over time.

Post-processor 208 converts the answer/response provided into the required output format and transmits the improved response to user interface 202.

Cognitive analyzer 212 is located in cognitive moderator engine 204 and an input from the pre-processor 206 is not structured enough, the cognitive analyzer 212 structures the input. In case of an input of text, cognitive analyzer 212 utilizes the natural language processor 210 in the following way:

For applying the method of division and assignment of queries, cognitive moderator engine 204 analyzes the query and divides it into parts which may, e.g., be distinguished by criteria like the following:

Geographic criteria: The dividing the question may take advantage of the geographic accuracy of the response. The question "which soccer player scored the most goals worldwide?" is, e.g., divided into "which soccer player scores the most goals in Switzerland?", "Which soccer player scores the most goals in England?". Thus, different geographical territories are tested one after the other.

Sensors/actuator related criteria: The dividing the question into sub-questions may be performed such that a monitoring or control of sensors/actuators in a complex system may become possible, e.g., questions to automatic steering systems: "Can I overtake the car ahead?" The cognitive moderator engine 204 divides and distributes such a question to optical sensors to track other possible cars, to the controller of the motor checking for available power, and to the navigator system to see whether sudden curves are imminent.

Thematic criteria: The dividing the question into sub-questions may also apply to the concept of dividing the query into logical parts. The method to divide the question into logical parts is based on natural language processing. For example, a question/query may be: "Is it more probable to win the lottery or a building being struck by lightning?". Such a question may be divided into "what is the probability of winning the lottery?" and "what is the probability of a building being struck by lightning?". The fractional questions are then submitted to cognitive engines 216, ..., 222. One question might be submitted to multiple cognitive engines. The choice of each cognitive engine is based on the capability (depending on training data on algorithms) that the cognitive engines have and on the availability, in order to optimize the solution.

A useful concept for cognitive analyzer 212 is to facilitate the learning process by means of a knowledge graph. Different entities are linked together with different relationships; e.g., a person can be linked with a date in a relationship "birthday". When processing a new answer to cognitive moderator engine 204, natural language processor 210 can identify new entities and lanes for the knowledge graph based on the input from the user interface 202, but also from the feedback from the different cognitive engines 216, ..., 222. The knowledge graph can then be utilized in the future to better structure or split new responses to cognitive moderator engine 204. The knowledge graph is stored in data store 214, i.e., knowledge database.

In order to give a more comprehensive idea about the consolidation and convergence of adequate responses, the following example may be provided: in the consolidation step of the process, the cognitive moderator engine answer disregards singular answers, i.e., answers provided only by one of the cognitive engines in the context of a plurality of cognitive engines. This aspect may be implemented if five or more cognitive engines may be involved in the system.

In the convergence step, the remaining responses (i.e., statements) are combined or bonded in one statement. The cognitive moderator engine checks whether the combined statement fulfills the criteria of self-consistency, relevancy, and coverage. In case that the combined onset fails any of the three test criteria, the cognitive moderator engine reformulates a combined statement avoiding the formulation leading to the failure of the test.

A vivid example may be the following: "What is special with 153?"

Answers may be provided by six cognitive engines:
A) 153 is the sum of the first integers from 1 to 17 and when forming a triangle out of 153 balls,
B) the triangle has the side-length of 17 balls each.
C) 153 is the sum of the first five factorials 1!+2!+3!+4!+5!.
D) 153 is the sum of the cubes of the digits $1^3+5^3+3^3$.
E) Miraculous pitch of 153 miles per hour
F) Car model 153 is special.
G) Alabama state route 153 is special.

And an elimination of poor or inadequate answers may be performed by reformulating the question by the cognitive moderate engine: What are unique attributes of the number 153? What distinguishes 153 from others? The check on self-consistency provides: cognitive engines D), E), and F)

would not give the same answer in the reformulated question asking for "unique attributes of the number 153".

The check on relevance: The cognitive engines E) providing a model of the car as an answer and the cognitive engine F) providing a highway number failed the test of relevancy, as it does not make a statement about the number itself. Only the answers from the cognitive engine A), B) and C) parse the test.

In this example, the consolidation and convergence of adequate answers can be seen in the following way: for the sake of the example it may be assumed that all answers A)-F) passed the first step. The consolidation step provides a removal of singular answers E), D), and F) as these statements are only given by a single cognitive engine and are not related in any way to the other answers. The convergence step delivers that the answers of the cognitive engines A), B), and C) are barred representations of the number 153. The converged answer could be: "the number 153 is special for its various representations which are $\Sigma i$ (i=1 to 17)=153, 1!+2!+3!+4!+5!=153 and $1^3+5^3+3^3$=153.

Figure 3:
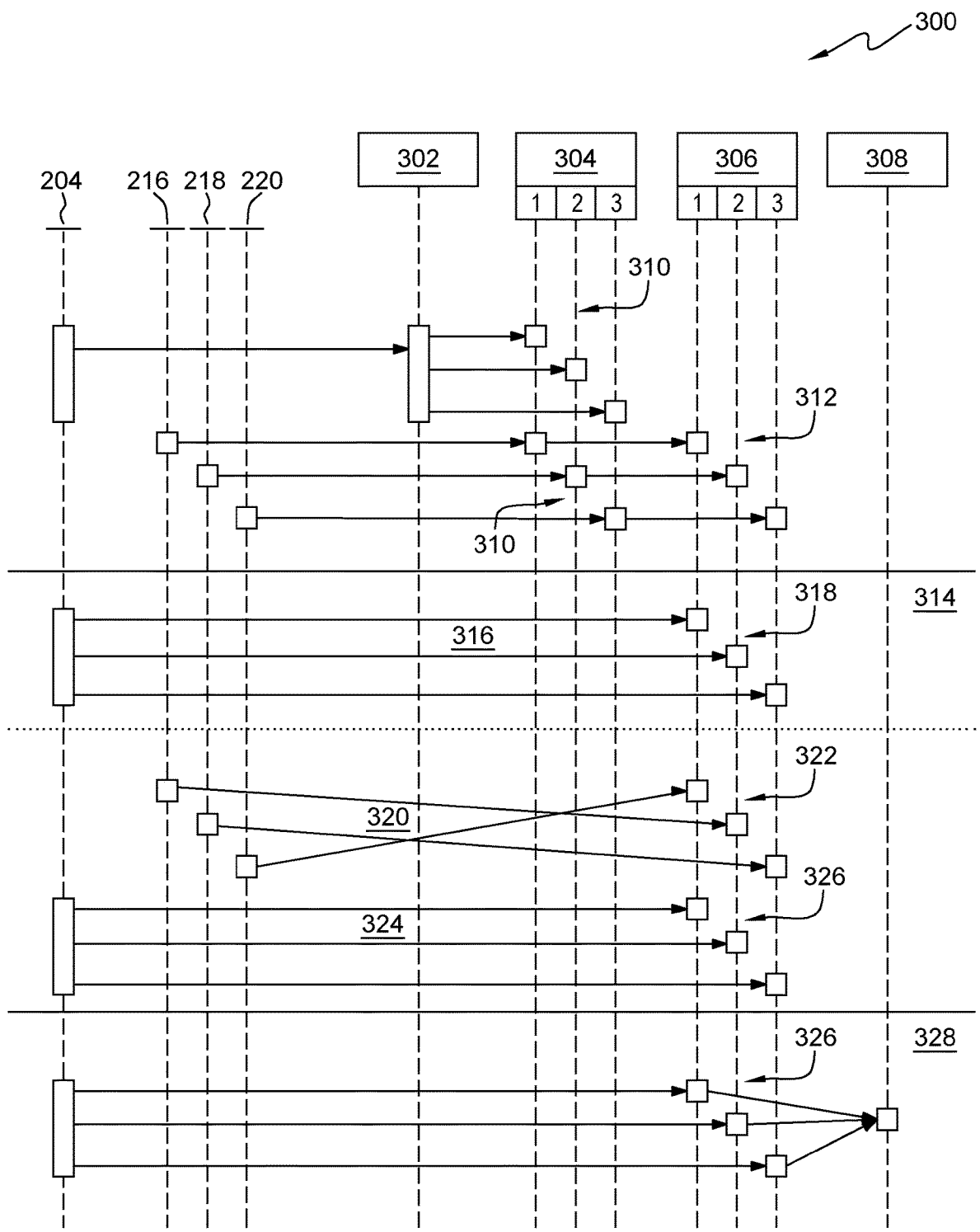
FIG. 3 is an example of a control flow graph for which a partial redundancy elimination module performs redundancy elimination, in accordance with an embodiment of the present invention.

FIG. 3 shows a block diagram 300 of involved elements of method 100 in a time diagram. It may be assumed that the time increases from the top to the bottom of the figure. The most left dotted line represents cognitive moderator engine 204 (compare FIG. 2, 204) at different moments in time. Major phases of the method 100 are separated by solid, horizontal lines. It may also be assumed that three cognitive engines 216, 218, 220 are involved. Initially, cognitive moderator engine 204 performs a division of a question or query based on a knowledge about cognitive engines 216, 218, 220 such that question 302 may be split into a divided question 304 represented by a first part, a second part and a third part symbolized by squares on dotted lines below divided question 304.

For partial questions 310, partial responses 312, for the first part, the second part and the third part are generated by cognitive engines 216, 218, 220. This is also represented by block 306 and the numbers 1, 2, 3 for the dotted timelines extending from block 306. In a next phase 314, cognitive moderator engine 204 eliminates, 316, directly poor or inadequate answers resulting in partial answers 318. Alternatively, in a next step to phase 314, peer review 320 is performed by cognitive engines 216, 218, 222 resulting in the next incarnation of partial response 322. This next step is symbolized by the horizontal dotted line in phase 314. This partial process is orchestrated by cognitive moderator engine 204, symbolized as the last set of lines 324 of phase 314 and the resulting partial response 326.

In a final phase 328, cognitive moderator engine 204 consolidates partial response 326 to an improved response or improved answer 308.

Cognitive moderator engine 204 uses the knowledge about cognitive engines 216, 218, 220 gained from the initial evaluation of the engines and from previous contributions to the answers finding process for the division and assignment of the question. After cognitive engines 216, 218, 220 have provided answers 312, either the cognitive engine itself eliminates poor and inadequate answers or the results from the peer reviews (cognitive engine A evaluates an answer from cognitive engine B) are used for the elimination step. Finally, cognitive moderator engine 204 consolidates and converges partial answers 326 into improved answer 308.

Figure 4:
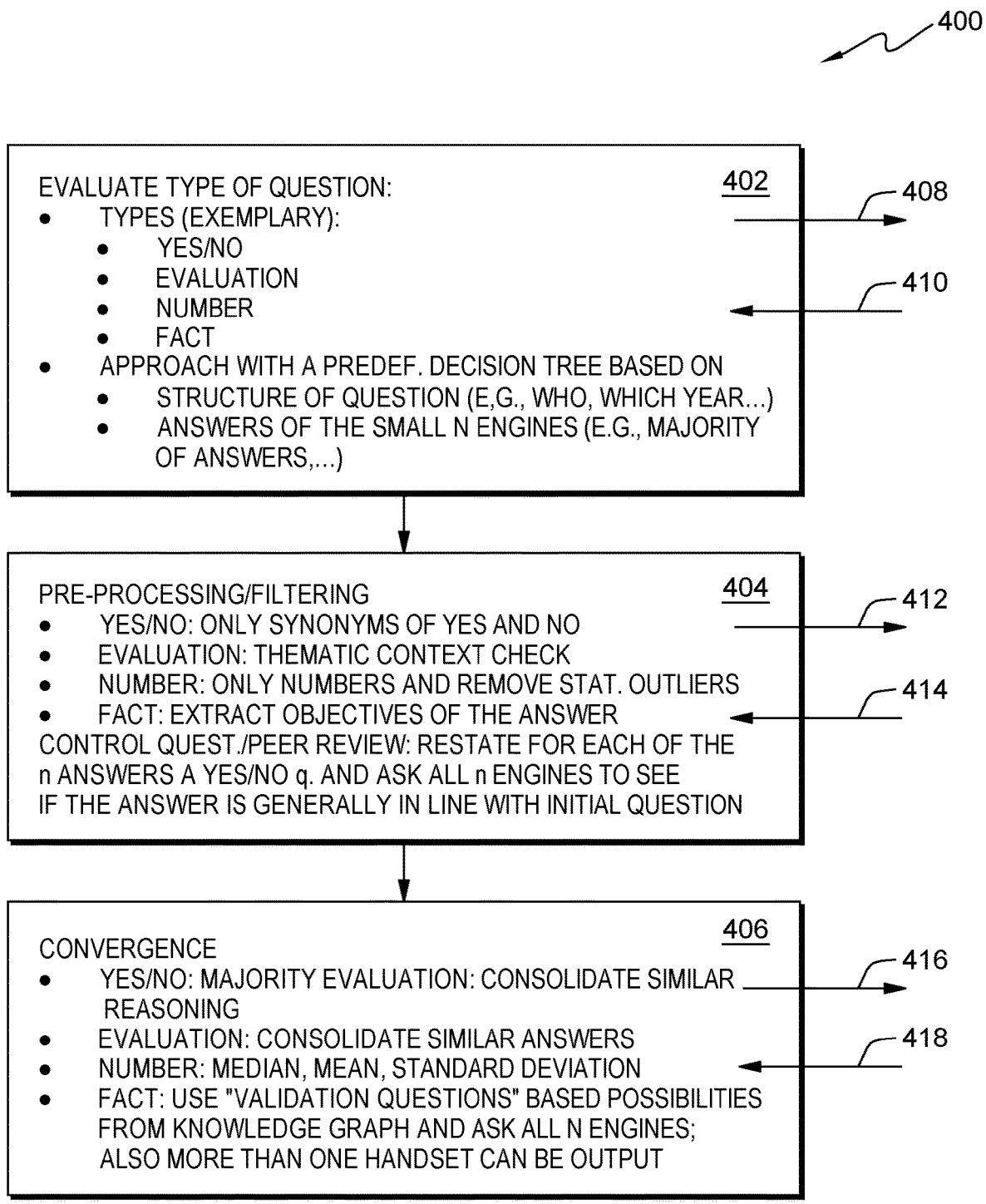
FIG. 4 is a table of characteristics for a set of memory locations and registers associated with the control flow graph of FIG. 3, in accordance with an embodiment of the present invention.

To facilitate filtering of answers, a peer review and the convergence of responses regarding the initial query is analyzed and categorized, as shown in FIG. 4. Block diagram 400 of FIG. 4, includes the tasks of cognitive moderator engine 204 in blocks 402, 404, 406 as well as the interactions—represented by arrows 408, 410, 412, 414, 416, 418, with cognitive engines 216, 218, 222. An arrow out of one of boxes 402, 404, 406 represents a signal flow from cognitive moderator engine 204 to at least one of cognitive engines 216, 218, 222, whereas an arrow into one of boxes 402, 444, 406 represents a signal flow from cognitive moderator engine 204 from at least one of cognitive engines 216, 218, 222.

In particular, arrow 408 represents that the question is passed to one of cognitive engines 216, 218, 222. Arrow 410 represents a reception of multiple answers from cognitive engines 216, 218, 222. Arrow 412 represents an asking of a control question/peer review from/by at least one of cognitive engines 216, 218, 222. Arrow 414 represents a received answer of the peer feedback. Arrow 416 represents asking validation questions and arrow 418 represents the related multiple of answers.

The consolidation and convergence algorithm is composed as follows once cognitive engines 216, 218, 222 answer the questions submitted by cognitive moderator engine 204, the moderator (short form for cognitive moderator engine 204) evaluates the answers relative to each other utilizing knowledge in the form of a knowledge graph. The evaluation identifies answers that are outliers and groups related answers to composite answers using the knowledge graph. Using this information, the cognitive moderator engine answers secondary questions to evaluate the composite answers, which are formulated in order to get a yes-or-no answer from the single instance. The answers are evaluated again and the questions probing the composition answers are re-iterated until cognitive engines 216, 218, 222 agree on a common statement. The agreement on a common statement depends on a user-defined threshold value ranging from 51% to 100%, when the threshold 100% value denotes that all of cognitive engines 216, 218, 222 answer yes or, all of them answer no.

The moderator post-processes the answers given and finds out "knowledge gaps" of the singular cognitive engine by applying a rating. The rating is engine specific and has multiple dimensions, which are classified by subject (e.g., microbiology, cryptography . . . ). The rating is evaluated with a series of questions with known answers each time that the training data and the engines are updated, i.e., each engine receives a subject-specific confidence level. In this scenario, the rating is used to find out the right answer to the yes-or-no question by combining the answers of the single engine with a weighted average (the weight is the rating). The "knowledge gaps" of singular engines are filled by adding training data, which in the easiest configuration is the question made by the moderator with the right answer. At this point, the process is repeated in an iterative fashion until the answers of all the engines to the first level question of the moderator are all coherent—i.e., the relative evaluation between the answers gives no outliers.

Figure 5:
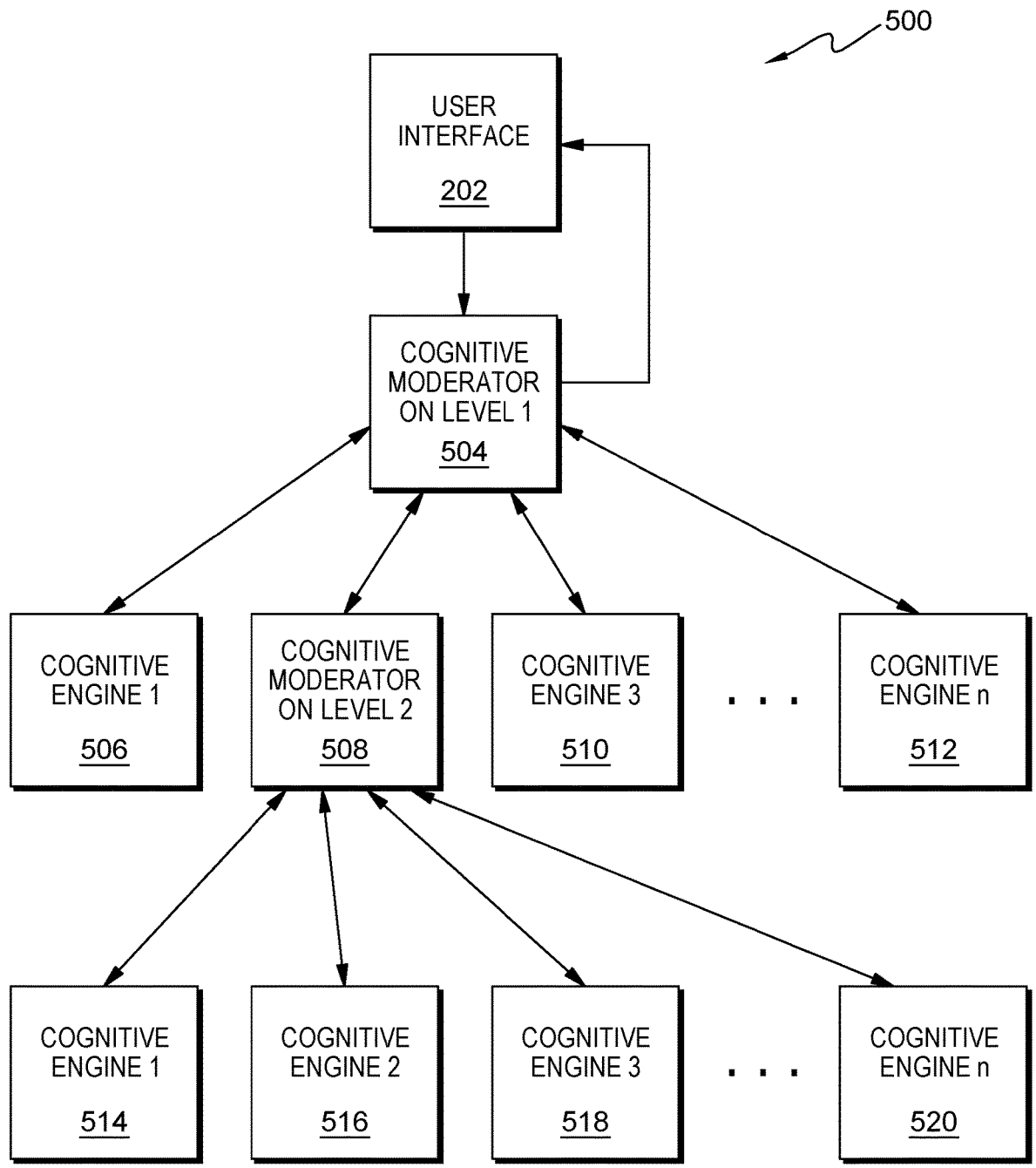
FIG. 5 is a table of global information for memory location M1 of FIG. 4 processed by the partial redundancy elimination module, in accordance with an embodiment of the present invention.

FIG. 5 shows a block diagram of an embodiment of hierarchy 500 of cognitive moderator engines. Here, the cognitive moderator engine is not only located on the top level but also on lower levels. As discussed above, user interface 202 is connected to cognitive moderator 504 on level 1. However, instead of the expected cognitive engine 2 at position 508, another cognitive moderator 508, which is connected to cognitive engines 514, . . . , 520, is present. Cognitive moderator 504 on the top level is connected to cognitive moderator engine 508 on the $2^{nd}$ level like any other cognitive engine. Possibly, cognitive moderator 504 does not recognize that one of the communication partners is a cognitive moderator instead of a cognitive engine.

Cognitive engines 506, 510, . . . , 512 are connected to cognitive moderator 504 on level 1, as described in the context of FIG. 2.

Figure 6:
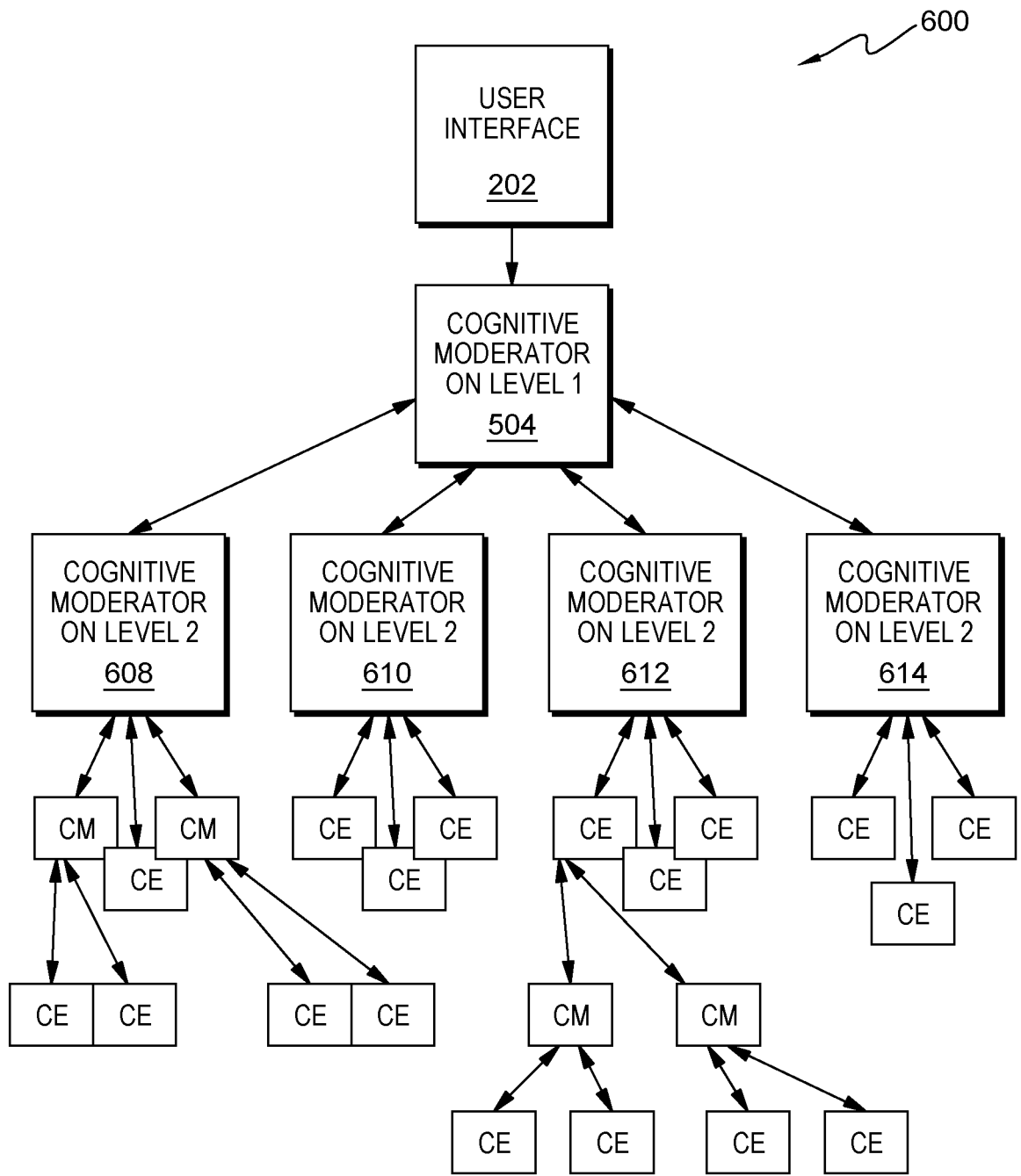
FIG. 6 is a block diagram of components of a computer system, such as the server computer of FIG. 1, in accordance with an embodiment of the present invention.

The concept of hierarchy 600 of cognitive moderators may be expanded to more levels, as shown in FIG. 6. Cognitive moderators 504, 608, 610, 612, 614 are not only located on the top level and the second level but also on lower levels. User interface 202 remains unchanged. For comprehensibility reasons, cognitive moderator engines (CM) and cognitive engines (CE) are shown without reference numerals. A skilled person may imagine a more complex hierarchy of cognitive moderators and cognitive engines.

In a general way, cognitive moderators (short form for cognitive moderator engines) and cognitive engines can be arranged in any possible tree structure as long as the following rules may be reflected: (1) The root location must be taken by a cognitive moderator connected to the UI. (2) All leaf positions must be taken by cognitive instances. (3) Leaf positions can be taken by cognitive engines. (4) Each cognitive moderator is connected with at least two objects of the next lower level and to one cognitive moderator on the next higher level.

Figure 7:
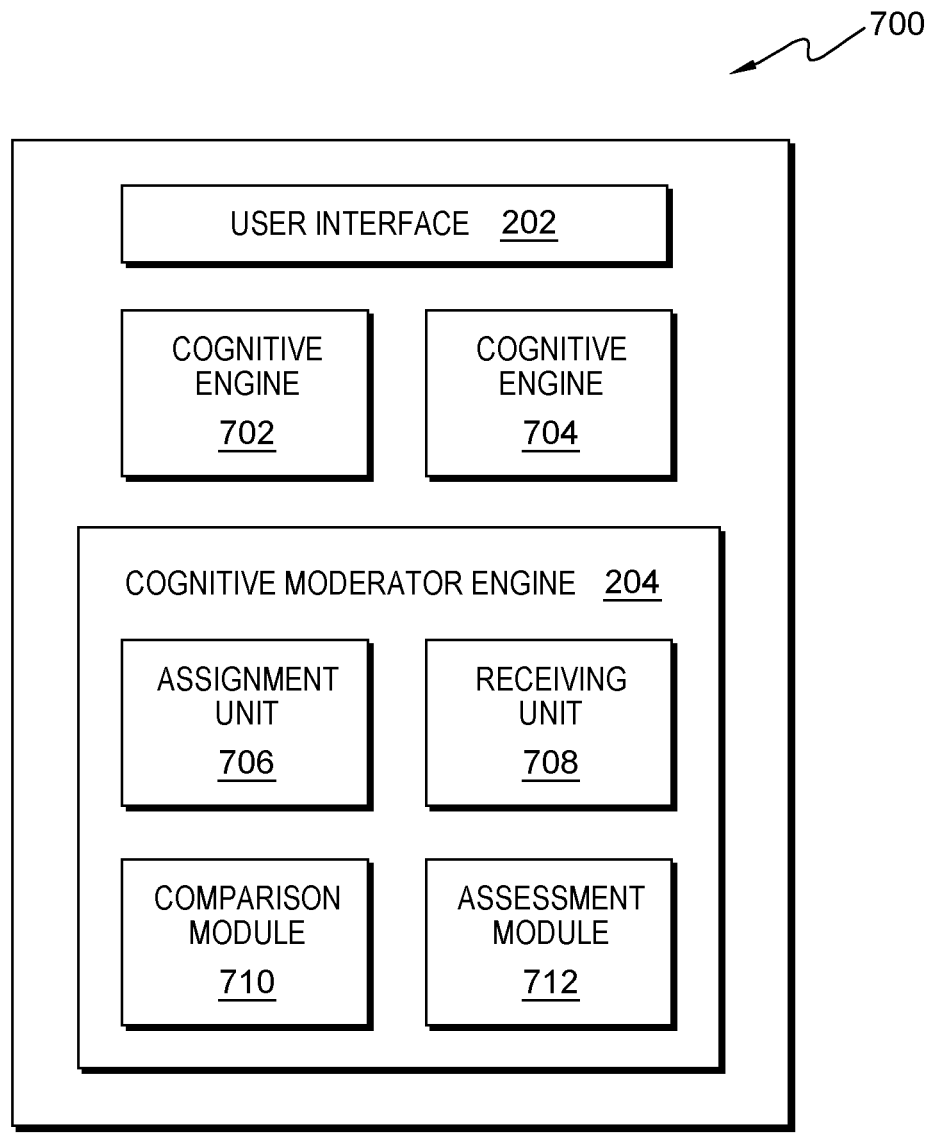
FIG. 7 is a consolidated block diagram of the system for generating an improved response to a query from two cognitive engines, in accordance with an embodiment of the present invention.

FIG. 7 shows consolidated block diagram 700 of the system for generating an improved response to a query from two different cognitive engines 602, 604 under another aspect if compared to the figures above. The system comprises user interface 202 adapted for receiving the query or question, cognitive moderator engine 204 comprising assignment unit 706 adapted for assigning the query to the two cognitive engines 702, 704 having different characteristics, receiving unit 708 adapted for receiving a response from each of the two cognitive engines 702, 704, comparison module 710 adapted for comparing the responses, and assessment module 712 adapted for performing a response mediation process upon assessing a difference above a predetermined threshold value between the responses The performing the response mediation process comprises feeding a response of a first of cognitive engines 702, 704 to a second one of cognitive engines 702, 704, determining a common concept of at least two of the responses and/or generating from a response and a knowledge database a second, and assigning it to the other one of the cognitive engines.

Cognitive moderator engine 204 is also adapted for activating assignment unit 706, receiving unit 708, comparison module 710, and assessment module 712 until the difference is below the predetermined threshold value. The system also comprises selection unit 714 adapted for selecting one of the responses as a final response in order to generate an improved response 308 (compare FIG. 3).

Figure 8:
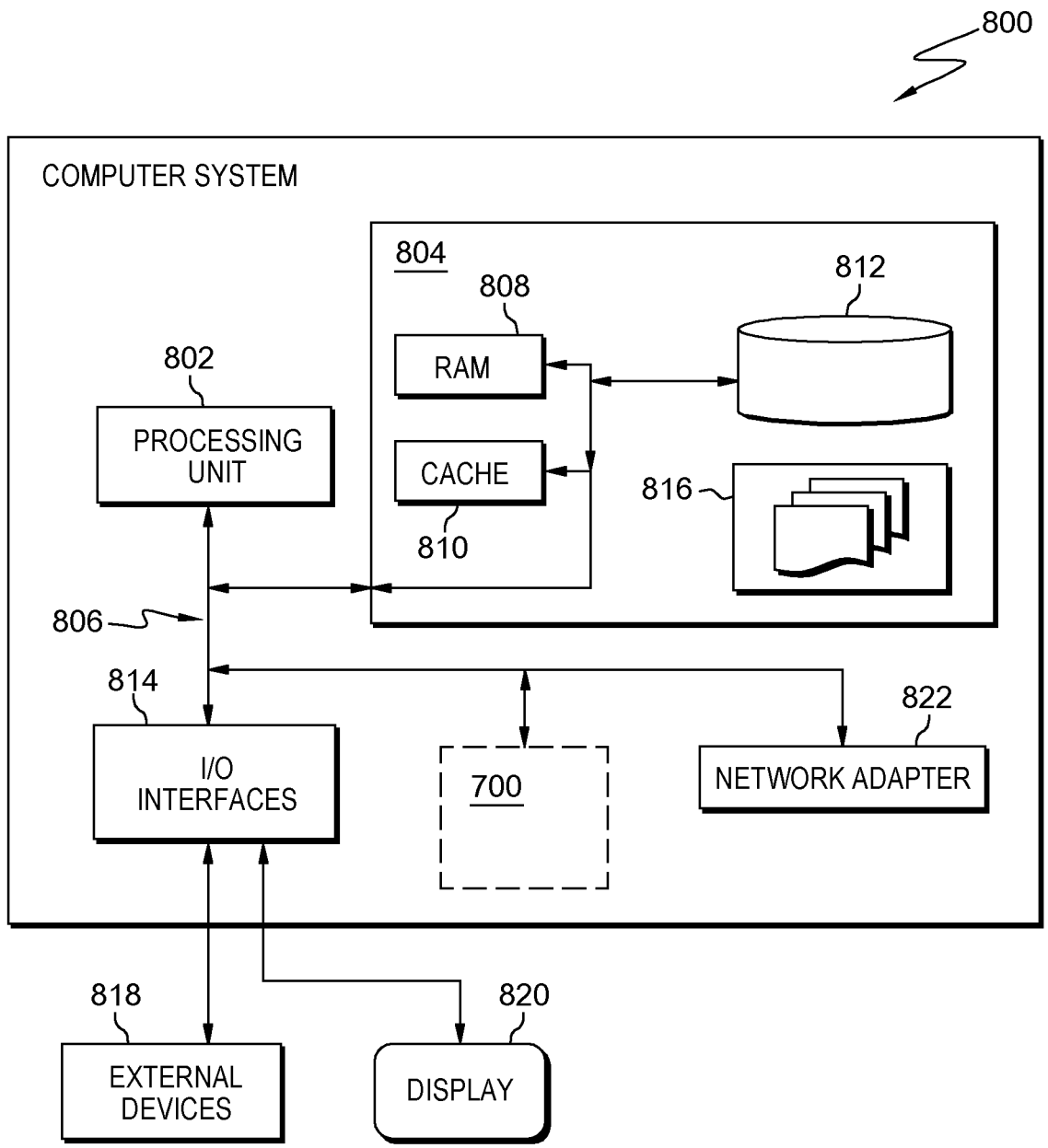
FIG. 8 is an example computing system suitable for executing program code related to the proposed method, in accordance with an embodiment of the present invention.

Embodiments of the invention may be implemented together with virtually any type of computer, regardless of the platform being suitable for storing and/or executing program code. FIG. 8 shows, as an example, computing system 800 suitable for executing program code related to the proposed method. It may be noted that computing system 800 may mainly be used as input/output engine for the system for generating an improved response to a query from two different cognitive engines.

The computing system 800 is only one example of a suitable computer system and is not intended to suggest any limitation as to the scope of use or functionality of embodiments of the invention described herein. Regardless, computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couples various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limitation, as well as an operating system, one or more application programs, other program modules, and program data. Each of the operating system, one or more application programs, other program modules, and program data or some combination thereof, may include an implementation of a networking environment. Program modules 816 generally carry out the functions and/or methodologies of embodiments of the invention as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of computer system/server 800 via bus 806. It should be understood that although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the system 800 for generating an improved response to a query from two different cognitive engines may be attached to the bus system 806.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for generating an improved response to a first query from a first cognitive engine and a second cognitive engine, the method comprising:

receiving, at the computing device, the first query;

assigning, by the computing device, the first query to a plurality of cognitive engines, wherein each of the plurality of cognitive engines includes different characteristics for processing data;

responsive to receiving a response from each of the plurality of cognitive engines for the first query, comparing, by the computing device, the received responses from the plurality of cognitive engines;

responsive to determining a difference between a first response from the first cognitive engine from the plurality of cognitive engines and a second response from the second cognitive engine from the plurality of cognitive engines is above a predetermined threshold value, mediating, by the computing device, the first cognitive engine and the second cognitive engine until the difference between the first response and the second response is below the predetermined threshold value, wherein the mediating comprises:

sending, by the computing device, the first response to the second cognitive engine;

determining, by the computing device, a common concept between the first response and the second response;

generating, by the computing device, a second query based on the first response and a knowledge database;

sending, by the computing device, the second query to the second cognitive engine; and receiving, at the computing device, a third response from the second cognitive engine for the second query, wherein a difference between the first response from the first cognitive engine and the third response from the second cognitive engine for the second query is below or equal to the predetermined threshold value;

selecting, by the computing device, a first final response from the received responses for the first query and the second query, wherein the received responses include the third response from the second cognitive engine for the second query;

displaying by the computing device, the first final response to a user;

adapting, by the computing device, the second cognitive engine based on the mediating of the first cognitive engine and the second cognitive engine, to generate another response with a scope of the first final response with respect to the common concept, wherein adapting the second cognitive engine includes altering content of the knowledge database by adding a new concept based on the common concept and adding, for the new concept, a new link between nodes of the knowledge database for the first cognitive engine and the second cognitive engine; and generating, by the computing device, a second final response based on the first final response and the adapted second cognitive engine.

2. The method of claim 1, wherein the first query, the second query, and the received responses are in natural language form.

3. The method of claim 1, wherein at least one characteristic of the different characteristics is selected from a group comprising: data sources, tuning parameters and algorithms.

4. The method of claim 1, further comprising:
classifying, by the computing device, the plurality of cognitive engines based on a set of test queries and a set of test responses, wherein a score value is assigned to each cognitive engine of the plurality of cognitive engines.

5. The method of claim 4, further comprising:
assessing, by the computing device, the first query; and
identifying, by the computing device, that the first cognitive engine has a score value greater than a score value of the second cognitive engine for the first query.

6. The method of claim 1, further comprising:
dividing, by the computing device, the first query into a first portion associated with a first category and a second portion associated with a second category, wherein the first category and the second category are selected from a group comprising: geographic topics, sensor type related topic, and thematic related topics; and
assigning, by the computing device, each of the first portion and the second portion of the first query to a different cognitive engine from the plurality of cognitive engines.

7. The method of claim 6, wherein assigning each of the first portion and the second portion of the first query is based on a category selected from a group comprising: geographic topics, sensor type related topics, thematic related topics.

8. The method of claim 1, wherein the first cognitive engine is the computing device.

9. The method of claim 1, wherein the second cognitive engine is the computing device.

10. The method of claim 1, further comprising:
eliminating, by the computing device, at least one response from a cognitive engine based on an assessment defined by self-consistency, relevance, and coverage by reformulating the first query in different formats and comparing related partial responses, wherein the different formats produce different responses compared to the at least one response from the cognitive engine.

11. The method of claim 10, wherein self-consistency is defined by a single response to at least two different queries.

12. The method of claim 10, wherein the at least one eliminated response does not match a type of query for the first query.

13. The method of claim 1, wherein coverage is defined by a response that addresses all portions of the first query.

14. The method of claim 1, further comprising:
selecting, by the computing device, the plurality of cognitive engines for assigning the first query based on an availability of each cognitive engine of the plurality of cognitive engines.

15. The method of claim 1, further comprising:
determining, by the computing device, a common concept for the first query comprises applying a fuzzy match method and/or a synonym match based on an ontology.

16. A computer system for generating an improved response to a first query from a first cognitive engine and a second cognitive engine, the computer system comprising:
one or more computer processors;
one or more non-transitory computer readable storage media; and
program instructions stored on the non-transitory computer readable storage media for execution by at least one of the one or more computer processors, the program instructions comprising:
program instructions to receive the first query;
program instructions to assign the first query to a plurality of cognitive engines, wherein each of the plurality of cognitive engines includes different characteristics for processing data;
program instructions to, responsive to receiving a response from each of the plurality of cognitive engines for the first query, compare the received responses from the plurality of cognitive engines;
program instructions to, responsive to determining a difference between a first response from the first cognitive engine from the plurality of cognitive engines and a second response from the second cognitive engine from the plurality of cognitive engines is above a predetermined threshold value, mediate the first cognitive engine and the second cognitive engine until the difference between the first response and the second response is below the predetermined threshold value, wherein the mediating comprises:
program instructions to send the first response to the second cognitive engine;
program instructions to determine a common concept between the first response and the second response;
program instructions to generate a second query based on the first response and a knowledge database;
program instructions to send the second query to the second cognitive engine; and
program instructions to receive a third response from the second cognitive engine for the second query, wherein a difference between the first response from the first cognitive engine and the third response from the second cognitive engine for the second query is below or equal to the predetermined threshold value;
program instructions to select a first final response from the received responses for the first query and the second query, wherein the received responses include the third response from the second cognitive engine for the second query;
program instructions to display the first final response to a user;
program instructions to adapt the second cognitive engine based on the mediating of the first cognitive engine and the second cognitive engine, to generate another response with a scope of the first final response with respect to the common concept, wherein adapting the second cognitive engine includes altering content of the knowledge database by adding a new concept based on the common concept and adding, for the new concept, a new link between nodes of the knowledge database for the first cognitive engine and the second cognitive engine; and
program instructions to generate a second final response based on the first final response and the adapted second cognitive engine.

17. The computer system of claim 16, wherein the first query, the second query, and the received responses are in natural language form.

18. The computer system of claim 16, wherein at least one characteristic of the different characteristics is selected from a group comprising: data sources, tuning parameters and algorithms.

19. The computer system of claim 16, further comprising program instructions, stored on the one or more non-transitory computer readable storage media, which when executed by a processor, cause the processor to:
classify the plurality of cognitive engines based on a set of test queries and a set of test responses, wherein a score value is assigned to each cognitive engine of the plurality of cognitive engines.

20. The computer system of claim 19, further comprising program instructions, stored on the one or more non-transitory computer readable storage media, which when executed by a processor, cause the processor to:
assess the first query; and
identify that the first cognitive engine has a score value greater than a score value of the second cognitive engine for the first query.

21. The computer system of claim 16, further comprising program instructions, stored on the one or more non-transitory computer readable storage media, which when executed by a processor, cause the processor to:
divide the first query into a first portion associated with a first category and a second portion associated with a second category, wherein the first category and the second category are selected from a group comprising: geographic topics, sensor type related topic, and thematic related topics; and
assign each of the first portion and the second portion of the first query to a different cognitive engine from the plurality of cognitive engines.

22. The computer system of claim 21, wherein program instruction to assign each of the first portion and the second portion of the first query is based on a category selected from a group comprising: geographic topics, sensor type related topics, thematic related topics.

23. A computer program product for generating an improved response to a first query from a first cognitive engine and a second cognitive engine, the computer program product comprising:
one or more non-transitory computer readable storage media and program instructions stored on at least one of the one or more non-transitory storage media, the program instructions comprising:
program instructions to receive the first query;
program instructions to assign the first query to a plurality of cognitive engines, wherein each of the plurality of cognitive engines includes different characteristics for processing data;
program instructions to, responsive to receiving a response from each of the plurality of cognitive engines for the first query, compare the received responses from the plurality of cognitive engines;
program instructions to, responsive to determining a difference between a first response from the first cognitive engine from the plurality of cognitive engines and a second response from the second cognitive engine from the plurality of cognitive engines is above a predetermined threshold value, mediate the first cognitive engine and the second cognitive engine until the difference between the first response and the second response is below the predetermined threshold value, wherein the mediating comprises:
program instructions to send the first response to the second cognitive engine;
program instructions to determine a common concept between the first response and the second response;
program instructions to generate a second query based on the first response and a knowledge database;
program instructions to send the second query to the second cognitive engine; and
program instructions to receive a third response from the second cognitive engine for the second query, wherein a difference between the first response from the first cognitive engine and the third response from the second cognitive engine for the second query is below or equal to the predetermined threshold value;
program instructions to select a first final response from the received responses for the first query and the second query, wherein the received responses include the third response from the second cognitive engine for the second query;
program instructions to display the first final response to a user;
program instructions to adapt the second cognitive engine based on the mediating of the first cognitive engine and the second cognitive engine, to generate another response with a scope of the first final response with respect to the common concept, wherein adapting the second cognitive engine includes altering content of the knowledge database by adding a new concept based on the common concept and adding, for the new concept, a new link between nodes of the knowledge database for the first cognitive engine and the second cognitive engine; and
program instructions to generate a second final response based on the first final response and the adapted second cognitive engine.

* * * * *